United States Patent Office 3,542,560
Patented Nov. 24, 1970

3,542,560
INFANT FORMULA WITH FAT COMPOSITION LIKE HUMAN MILK
Rudolph M. Tomarelli, Chester, and Finn W. Bernhart, Radnor, Pa., assignors to American Home Products Corporation, New York, N.Y., a corporation of Delaware
No Drawing. Filed Dec. 6, 1967, Ser. No. 688,326
Int. Cl. A23c 11/00
U.S. Cl. 99—63        2 Claims

ABSTRACT OF THE DISCLOSURE

An infant formulation substantially approximating human milk in fat assimilability is prepared by adding to a poorly fat-assimilable milk product, a fat having a high content of beta-palmitic acid until the beta-palmitic acid content of the formulation is at least 25 percent by weight of the total palmitic acid content.

This invention relates to infant food formulations and novel processes for their manufacture. More particularly, this invention relates to the manufacture of an infant food formulation with a fat content that has a large portion of the palmitic acid moiety esterified as $\beta$-palmitic acid rather than in $\alpha,\alpha'$-position.

In the past, ready-to-feed infant formulations have been prepared by the appropriate blending of ingredients, including varying proportions of selected animal fats to yield a fatty acid composition approximating that of human milk fat. However, the fatty acids of such artificial formulations have not been as well absorbed by the infant, or by experimental animals, e.g., the laboratory rat, as are the natural fatty acids in human milk.

It has now been found that the superior absorbability of human milk fat resides to a great extent in its high content of $\beta$-palmitic acid, that is palmitic acid in the 2-position of the triglyceride molecule. Without wishing to be bound by a theory of operation, it is believed that the positional distribution of palmitic acid is significant because, in the intestinal tract, pancreatic lipase digests the triglyceride to form two free fatty acids and a $\beta$-monoglyceride. That is, the lipase specifically releases the fatty acids in the $\alpha$ and $\alpha'$ positions of the triglyceride molecule leaving substantially intact the fatty acid at the $\beta$-position. Also the long chain saturated fatty acids, e.g. palmitic and stearic acids, which are present after digestion of the triglyceride are known to be relatively poorly absorbed, in contrast to the better absorption of these acids when present as the $\beta$-monoglycerides. Fats having palmitic acid in the $\beta$-position have been found to be well absorbed. Because of the specificity of hydrolysis by pancreatic lipase on the fatty acids in the $\alpha$ and $\alpha'$-positions of the triglyceride molecule, a fat with a relatively high proportion of $\beta$-palmitic acid will be better absorbed than a fat blend with a similar fatty acid composition but with a high percentage of palmitic acid esterified in the $\alpha,\alpha'$-position and a lower percentage as $\beta$-palmitic acid.

It is an object of this invention to provide an infant food formulation having a fat both similar in percent by weight of fatty acids to human milk fat, and that is as well absorbed as human milk fat.

It is another object of this invention to provide an infant food formulation which has a fatty acid composition and a positional distribution of the palmitic acid thereof, similar to human milk fat.

It is still another object of this invention to provide processes for the manufacture of an infant food formulation which has a fat composition that is similar to, and as well absorbed as, human milk.

The objects of this invention may be achieved by manufacturing an infant formulation containing a fat blend in which at least 25 percent by weight of the palmitic acid present is $\beta$-palmitic acid. Preferably the $\beta$-palmitic acid is from about 45 to 100 percent of the total palmitic acid content. Especially advantageous results have been obtained with $\beta$-palmitic acid concentrations above about 80 percent. The total palmitic acid content is preferably at least 25 percent of the total fat content as is further described below in Tables I, II, and IV. The remainder of the formulation may be non-fat milk, such as cow's milk, soy lecithin, carrageenin, vitamins, minerals and water.

Surprisingly, it has been found the total fat absorption increases directly with an increase in $\beta$-palmitic acid content.

A ready-to-feed infant formulation more closely simulating the fat content of human milk than any now known may be prepared as follows. Natural animal fats may be selected to supply the desired proportion of $\beta$-palmitic acid. Such natural animal fats include lard, porpoise fat, whale fat and the like. The selected fats may then be blended to form a formulation of the present invention.

Many other animal fats and oils may be blended in various proportions to achieve a formulation having the characteristics desired in the present invention. The formulation of the present invention may be prepared by blending fats having a relatively high proportion of $\beta$-palmitic acid, such as lard and butter oil, with other known fats and oils which have a relatively low proportion of $\beta$-palmitic acid, such as corn, soybean, palm, peanut, coconut, olive, babassu, cottonseed, oleo, tallow and the like. Lard has about 85 percent of $\beta$-palmitic acid and butter oil has about 44 percent of $\beta$-palmitic acid. Such blends are exemplified in Table I.

TABLE I.—TYPICAL FAT BLENDS HAVING HIGH $\beta$-PALMITIC ACID CONTENT

| Fatty acid moiety | Weight percent fatty acids | | | | |
|---|---|---|---|---|---|
| | 70 lard 10 coconut oil 20 palm oil | | 70 lard 10 coconut 20 butter oil | | Human milk fat |
| Lauric | 5.5 | | 6.0 | | 4.7 |
| Myristic | 5.5 | | 5.3 | | 7.8 |
| Palmitic | 27.8 | ,(59*) | 26.0 | (71*) | 27.3 (68*) |
| Stearic | 10.3 | | 11.8 | | 9.7 |
| Oleic | 38.8 | | 34.4 | | 34.5 |
| Linoleic | 10.0 | | 8.4 | | 9.5 |
| Linolenic | 0.7 | | 0.9 | | 1.5 |
| Total | 98.6 | | 92.8 | | 95.0 |

*Percent of $\beta$-palmitic acid based on total palmitic acid content.

An infant food formulation within the scope of the present invention may also be prepared by adding to a $\beta$-palmitic acid deficient formulation a concentrate containing triglycerides, diglycerides or monoglycerides, or a combination of them, which contain about 30 to 100 percent by weight of $\beta$-palmitic acid. The concentrates may be of natural or synthetic origin. An example of such a mix is shown in Table II, where $\beta$-monopalmitin is the concentrate added.

TABLE II.—TYPICAL FAT BLENDS PREPARED WITH β-PALMITIC ACID CONCENTRATE

| Fatty acid moiety | Percent Fatty Acids | | |
|---|---|---|---|
| | 15 Coconut oil 40 Oleo oil 25 Peanut oil 5 Palm oil 15 β-Monopalmitin | 7.5 Coconut oil 42.5 Butter fat 15.0 Soybean oil 21.0 Olive oil 14 β-Monopalmitin | 10 Babassu oil 22.5 Mutton tallow 12.5 Soybean oil 20.0 Butter fat 20.0 Olive oil 15.0 β-Monopalmitin |
| Lauric | 8.2 | 5.7 | 5.3 |
| Myristic | 4.0 | 6.5 | 4.7 |
| Palmitic | 27.4 (53*) | 29.7 (65*) | 29.8 (62*) |
| Stearic | 8.9 | 5.9 | 10.2 |
| Oleic | 34.2 | 30.8 | 33.7 |
| Linoleic | 8.2 | 10.9 | 9.4 |

* Percent of β-palmitic acid based on total palmitic acid content.

A complete ready-to-feed formulation utilizing the present invention may be comprised as shown in Table III, where w./w. is percent by weight of ingredient per total weight of formulation and w./v. is percent by weight of ingredient per total volume of the formulation.

TABLE III.—TYPICAL READY-TO-FEED FORMULATION

| | Undiluted | | Diluted, w./w. |
|---|---|---|---|
| | Liquid, w./v. | Powder, w./w. | |
| Fat | 2-10 | 8-40 | 1-5 |
| Carbohydrate | 8-20 | 32-80 | 4-10 |
| Protein | 1.8-6.6 | 7.2-26.4 | 0.9-3.3 |
| Ash | 0.30-1.6 | 1.20-6.4 | 0.15-0.8 |
| Total solids | 16-34 | 95-100 | 8-17 |
| Water | 84-66 | 0-5 | 92-83 |

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE

This experiment shows the unexpected role of 2-palmitic triglycerides in the absorption of fats in an animal.

Experiments were conducted with standard laboratory animals to explore the relationship of triglyceride structure to fat absorption. The fats studied included human milk fat, butter oil, lard, oleo (beef fat), experimental fat mixtures made up of oleo, palm, peanut and corn oil, hereinafter identified as OPPC, and an experimental fat mixture made up of lard, butter oil and coconut oil, hereinafter identified as LBC. The OPPC has a percent by weight fatty acid composition similar to human milk but has a low proportion of β-palmitic acid. The LBC has a percent by weight fatty acid composition similar to human milk fat and has a high proportion of β-palmitic acid.

PART I

Determination of the positional distribution of the fatty acids

The proportion of each fatty acid in the β-position of the triglycerides of the fats under study was determined by the procedure of Brockerhoff and Yurkowski, J. Lipid Res. 7, 62 (1966). In brief; the fat samples were digested by pancreatic lipase to a predetermined point; the products of digestion were extracted from the mixture and the monoglycerides separated by thin layer chromatography. The fatty acid composition of the monoglycerides and of the original triglycerides was determined by gas-liquid chromatography.

Proportion of fatty acids in the β-position

The data in Table IV lists the composition and percent by weight of the major fatty acids of the original fats and the percent by weight in the β-position. The percent of the total amount of each fatty acid that occupies the β-position was calculated from the formula:

$$\frac{\text{mole percent of palmitic acid in monoglyceride}}{3 \times \text{mole percent of palmitic acid in triglyceride}}$$

using palmitic acid for an example.

An important feature in this comparison of the various fats is that palmitic acid is predominantly in the β-position only in human milk, lard, and in the LBC mixture.

TABLE IV.—FATTY ACID COMPOSITION OF FAT SAMPLES AND THE PROPORTION IN THE β-POSITION

| Fatty acids | LBC [1] | | Human milk | | OPPC [2] | | Lard | | Oleo | | Butterfat | |
|---|---|---|---|---|---|---|---|---|---|---|---|---|
| | Percent[3] | Percent β | Percent | Percent β | Percent | Percent β | Percent | Percent β | Percent | Percent β | Percent | Percent β |
| Lauric | 5.3 | 67 | 4.7 | 36 | 10.0 | 73 | | | | | 2.9 | 51 |
| Myristic | 5.1 | 62 | 7.8 | 57 | 5.0 | 34 | 1.6 | 88 | 3.6 | 67 | 12.0 | 69 |
| Palmitic | 25.2 | 71 | 27.3 | 68 | 25.8 | 18 | 26.8 | 84 | 26.3 | 18 | 30.7 | 43 |
| Stearic | 11.6 | 11 | 9.7 | 5 | 7.7 | 12 | 13.0 | 10 | 18.6 | 14 | 11.6 | 11 |
| Oleic | 38.9 | 7 | 34.5 | 9 | 35.6 | 35 | 43.3 | 8 | 43.6 | 44 | 26.0 | 16 |
| Linoleic | 8.7 | 12 | 9.5 | 18 | 11.4 | 51 | 11.2 | 10 | 2.4 | 44 | 1.8 | 18 |
| Linolenic | 0.8 | | 1.5 | | 0.7 | | 1.0 | | | | 0.9 | |

[1] LBC=Lard, butter, coconut.
[2] OPPC=Oleo, palm, peanut, coconut.
[3] Weight percent.

PART II

Determination of fat absorption

Young male Sprague-Dawley rats were maintained on a fat-free basal diet consisting of casein, 220 grams per kilogram of diet (gm./kg.), glucose 738 gm./kg.; salt mixture, 40 gm./kg.; vitamin mixture, 1 gm./kg.; and choline chloride, 1 gm./kg. Each rat received a daily supplement of 0.1 milliliter (ml.) of corn oil except for 3 days before the start of an assay and during the 6 day assay period.

At the start of the assay the rats were divided into groups with equal average body weights, 6 rats per group. Each group was fed the test fat, as shown in Table V below, incorporated into the basal diet at the 15 percent fat level replacing an equal amount of glucose. The fat diets were fed for 3 days and then the fat-free diet for the next 3 days. All feeding was ad libitum. Feces were collected for the entire 6 days. The fat intake was determined from a measurement of food consumption. In each experiment, a group receiving only the fat-free diet for the 6 days, served as a control for the estimation of endogeneous fecal fat excretion for rats of the same strain, age and body weight. The total fatty acid content of the food and the feces was determined by the procedure of van de Kamer, Hawk's Physiological Chemistry 14th Ed., p. 539.

Percent of fat absorption based on fat intake was calculated from the following formula. Where meq. means milliequivalents.

$$\text{Fat absorption} = 100 - \left( \frac{\text{meq. fecal fatty acids} - \text{meq. endogenous fatty acids}}{\text{meq. food fatty acids}} \times 100 \right)$$

The absorption of specific fatty acids was calculated in the same manner, i.e., meq. of each fatty acid in the feces was corrected for endogenous excretion of that fatty acid.

The results of the fat absorption study are summarized in Table V with the absorbability of the various fats presented in decreasing order. Since replicate determinations agree closely, the values for each fat were combined for statistical analysis. With the exception of the comparison, OPPC vs. butter, each average value was significantly different from all the others. ($t$ test, $p=0.05$ or less).

The LBC mixture, resembling human milk fat in total fatty acid composition but containing a slightly higher proportion of β-palmitic acid, was slightly better absorbed than human milk fat. In contrast, the OPPC mixture also with a fatty acid composition simulating human milk but with a low proportion of β-palmitic acid was definitely less well absorbed.

TABLE V.—TOTAL FATTY ACID ABSORPTION

| Fat | Percent absorption | | | | Average±S.E |
|---|---|---|---|---|---|
| | 1 | 2 | 3 | 4 | |
| LBC | 95.9±0.55 | 96.6±0.70 | | | 96.3±0.46 |
| Human milk fat | 94.8±0.35 | 94.8±0.83 | 95.3±0.30 | 94.7±0.90 | 94.9±0.14 |
| Lard | 92.3±0.67 | 92.5±0.66 | | | 92.4±0.45 |
| OPPC | 90.6±0.72 | 89.1±0.74 | 90.1±0.28 | | 89.9±0.17 |
| Butter fat | 90.4±1.3 | 88.7±0.41 | | | 89.5±0.85 |
| Oleo | 81.2±1.9 | 78.6±0.49 | | | 79.9±0.93 |

The absorption of the individual fatty acids is presented in Table VI.

TABLE VI.—INDIVIDUAL FATTY ACID ABSORPTION

| Fatty acid | LBC [1] | Human Milk | Lard | OPPC [2] | Butterfat | Oleo |
|---|---|---|---|---|---|---|
| Lauric | 99.4 | 98.7 | | 96.1 | 96.5 | |
| Myristic | 97.1 | 96.8 | 98.0 | 87.8 | 92.7 | 89.1 |
| Palmitic | 95.1 | 92.5 | 93.4 | 78.2 | 82.5 | 67.0 |
| Stearic | 82.3 | 74.3 | 68.0 | 70.4 | 73.4 | 53.4 |
| Oleic | 98.6 | 97.1 | 96.8 | 97.1 | 96.9 | 94.1 |
| Linoleic | 99.5 | 99.4 | 99.4 | 99.1 | 99.5 | 98.3 |
| Total fatty acids | 96.3 | 94.9 | 92.4 | 89.9 | 89.5 | 79.9 |

[1] See footnote at end of Table IV.
[2] See footnote at end of Table IV.

The unsaturated $C_{18}$ fatty acids and the saturated fatty acids having fourteen or fewer carbons were almost completely absorbed. Stearic acid was poorly absorbed, with absorption ranging from 53.4 in oleo oil to 82.3 percent in LBC. Palmitic acid absorption ranged from 67.0 percent in oleo oil to 95.1 percent in LBC.

The relationship between absorption and positional distribution for palmitic and stearic acids is shown in Table VII.

TABLE VII.—RELATION OF POSITIONAL DISTRIBUTION AND ADSORPTION OF SATURATED FATTY ACIDS

| Palmitic acid | | | Stearic acid | | |
|---|---|---|---|---|---|
| Fat | Weight percent adsorbed | Weight percent in β position | Fat | Weight percent absorbed | Weight percent in β position |
| LBC | 95.1 | 71 | LBC | 82.3 | 11 |
| Lard | 93.4 | 84 | Butterfat | 73.4 | 11 |
| Human milk | 92.4 | 68 | Human milk | 74.3 | 5 |
| Butterfat | 82.5 | 43 | OPPC | 70.4 | 12 |
| OPPC | 78.2 | 18 | Lard | 68.0 | 10 |
| Oleo oil | 67.0 | 18 | Oleo | 53.4 | 14 |

As may be seen in Table VII a direct relationship exists between absorption and percent in the β-position for palmitic acid but does not exist for stearic acid. The superior absorption of the β-palmitic acid of LBC in relation to its proportion in the β-position compared with lard is believed to be due to the higher stearic acid content in the lard which interferes with β-palmitic acid absorption.

From the foregoing results, it may be concluded that the absorbability of a fat is dependent on a number of factors. Of major importance is its content of stearic and palmitic acids, the less well absorbed constituents. The content of oleic and linoleic acid is known in the art to be of importance. For instance, it is known that the absorption of stearic and palmitic acids is improved by the addition of unsaturated oils to a fat mixture. (Nutrition Rev. 22, 191 (1964)). It has been found from the foregoing experimentation, with regard to palmitic acid absorption, that positional distribution of the fatty acid in the triglyceride molecule plays a role in fat absorption. Particularly, it has been found that a high β-palmitic acid content increases the total fat absorption.

In analyzing the data of the present study it appeared that, at least with the six fats studied, the most important factors interfering with total fat absorption in the rat are the content of palmitic acid in the α position and total stearic acid content. With the aid of a digital computer numerous equations relating fat excretion with fatty acid compoistion were examined and a high degree of correlation was found in all equations emphasizing the content of α palmitic and α or total stearic acid. An example of one of the simpler descriptions of the relationship was:

total fatty acid excreted$=0.05$ (α palmitic x α stearic)$+2.5$; $\gamma^2=0.91$; with fatty acid concentrations expressed as mole percent.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for the preparation of a formulation particularly adapted for human infant nutrition substantially approximating human milk in fat assimilability and fatty acid composition comprising adding to a poorly fat-assimilable milk product, a fat having a high content of β-palmitic acid until the β-palmitic acid content of the formulation is at least 25 percent by weight of the total palmitic acid content and further having a lauric acid content of at least about 5.3 to 8.2 percent by weight of the total fatty acids and a myristic acid content of at least about 4.0 to 6.5 percent by weight of the total fatty acids.

2. A process as defined in claim 1 in which the addition step is carried out by blending animal and synthetic fats with said milk product, said blended combination providing a β-palmitic acid content of the product in the amount of at least 25 percent by weight of the palmitic acid moiety.

References Cited

UNITED STATES PATENTS 2,611,706  9/1952  Bernhart et al. _____ 99—54 X
3,201,245  8/1965  Clark et al. _____ 99—63 X LIONEL M. SHAPIRO, Primary Examiner D. M. NAFF, Assistant Examiner U.S. Cl. X.R.

99—57, 118